United States Patent [19]

Klomp

[11] Patent Number: 4,643,142
[45] Date of Patent: Feb. 17, 1987

[54] SQUISH CONTROL ENGINE

[75] Inventor: Edward D. Klomp, Mt. Clemens, Mich.

[73] Assignee: General Motors Corporation, Detroit, Mich.

[21] Appl. No.: 824,194

[22] Filed: Jan. 30, 1986

[51] Int. Cl.$^4$ .............................. F01L 1/32; F01L 3/06
[52] U.S. Cl. .......................... 123/90.28; 123/188 AF; 123/188 VA; 123/661
[58] Field of Search ............ 123/90.28, 90.3, 188 VA, 123/188 AF, 193 P, 193 CP, 661

[56] References Cited

U.S. PATENT DOCUMENTS

| | | | |
|---|---|---|---|
| 2,768,617 | 10/1956 | Tierney, Jr. et al. | 123/188 VA |
| 3,424,139 | 1/1969 | Brooks | 123/188 AF |
| 3,557,762 | 1/1971 | Mitchell | 123/188 AF |
| 3,927,655 | 12/1975 | Goto et al. | 123/193 A |
| 3,933,143 | 1/1976 | Gurtler | 123/193 P |
| 4,137,886 | 2/1979 | Hiramatsu | 123/90.28 |
| 4,151,816 | 5/1979 | Schroder | 123/188 AF |
| 4,309,966 | 1/1982 | Klomp | 123/90.28 |
| 4,309,969 | 1/1982 | Matthes | 123/90.28 |
| 4,432,312 | 2/1984 | Klomp et al. | 123/188 VA |

Primary Examiner—Ira S. Lazarus
Attorney, Agent, or Firm—Robert J. Outland

[57] ABSTRACT

Squish control is provided in an internal combustion engine such as a diesel engine by providing in a preferred embodiment arcuate dams on the inner faces of rotatable intake and exhaust valves or the like which coact with arcuate grooves or recesses of the piston squish land to direct squish flow from adjacent the valve inner faces into outward inward or circumferential directions and thus increase decrease or provide a swirl component to squish flow into a central combustion chamber recess.

7 Claims, 4 Drawing Figures

SQUISH CONTROL ENGINE

FIELD

This invention relates to internal combustion engines of the reciprocating piston type wherein gas motion is generated in the combustion chamber by squish. Direct fuel injection diesel engines are prime examples of engines commonly using this feature.

BACKGROUND

Many direct fuel-injection reciprocating piston internal combustion engines depend upon gas motion generated during the compression process for the mixing of air and fuel to enhance the combustion process and to improve air utilization. However, because of the wide operating range demanded of engines in applications such as vehicles, the combustion chamber configuration selected represents a compromise for conventional fixed geometry engines.

Many schemes exist for enhancing cylinder combustion conditions by varying the intake flow passage configuration; see, for example, my U.S. Pat. No. 4,539,954 granted Sept. 10, 1985 to the assignee of the present invention. Also, proposals have been made for varying fuel nozzle flow passages as in my U.S. Pat. No. 4,096,995 granted June 27, 1978 to the assignee of the present invention. However, alterations in combustion chamber geometry during engine operation in response to abrupt changes in operating conditions can be challenging because of the periodic exposure to high temperatures and pressures, the limited space available for control hardware, the need for rapid response and the possibility of adversely compromising the combustion chamber shape.

INVENTION SUMMARY

The present invention comprehends engine combustion chamber squish flow control arrangements which provide means for controlling gas motion in an operating engine while meeting many or all of the concerns previously noted.

In a preferred embodiment, the invention provides arcuate vanes in the inner end surfaces on one or more of the engine valves which face the squish land of a diesel engine piston. Means are provided to rotate the valves around their axes to vary the position of the vanes which coact with opposing grooved and flat surfaces of the piston squish land to restrict or direct squish flow from under the valves either into, away from, or in a swirling motion about a combustion chamber recess provided in the piston.

Variations in application of the invention include the provision of flow directing vanes on any number of cylinder valves and/or on separately provided rotatable elements defining a portion of the combustion chamber end wall and facing the piston. Flat or curved valve end surfaces may be utilized, depending upon the associated piston configuration.

These and other features and advantages of the invention will be more fully understood from the following description of selected embodiments taken together with the accompanying drawings.

DRAWINGS

DESCRIPTION

Figure 1:
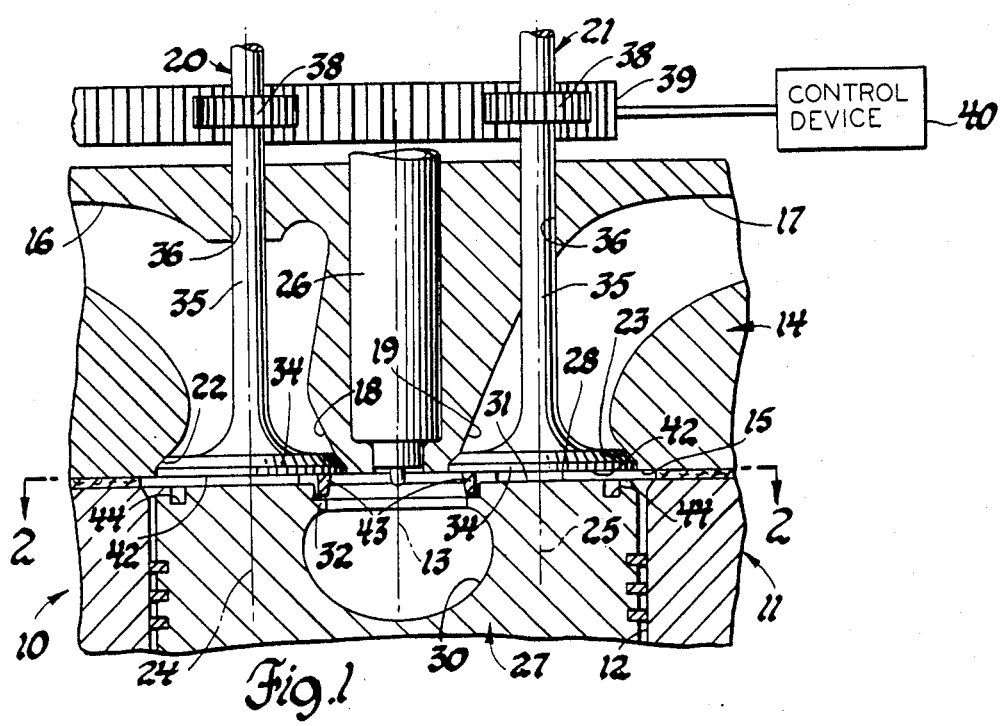
FIG. 1 is a fragmentary cross-sectional view of a portion of a direct injection diesel internal combustion engine having squish control means in accordance with the invention.

In the drawings, numeral 10 generally indicates an internal combustion engine of the direct injection diesel type.

Engine 10 includes a cylinder block 11 defining at least one cylinder 12 having an axis 13 and closed at one end by a cylinder head 14. The closed end of the cylinder 12 is formed in part by a generally flat wall 15 of the cylinder head in which an intake port 16 and an exhaust port 17 respectively define port openings 18, 19, which open to the cylinder at diametrically opposite sides thereof.

Poppet type intake and exhaust valves 20, 21 are seatable on valve seats 22, 23, respectively formed in port openings 18, 19 and the valves are reciprocable respectively on axes 24, 25 which are parallel with the cylinder axis 13 and normal to the wall 15. Preferably, a fuel injector 26 is also mounted in the cylinder head, centrally of the end of the cylinder.

A piston 27 is reciprocably mounted in the cylinder 12 in conventional fashion. The piston includes a head end 28 having a central combustion chamber recess 30 surrounded by an annular squish land 31. In the top dead center position of the piston, shown in FIG. 1, the squish land 31 extends in closely opposed relation to the cylinder head wall 15. The combustion chamber recess is of reentrant design having an annular rib 32 extending inwardly around its upper edge, although other forms of piston recesses of straight or reentrant design might equally well be utilized.

The intake and exhaust valves 20, 21, respectively, are supported within the cylinder and actuated by conventional means, not shown, for reciprocatory opening and closing motions in conjunction with normal engine operation. Each of the valves includes a head 34 connected with a stem 35 which is supported in a valve guide 36. A pinion gear 38, mounted on each valve stem, engages a rack 39 which is reciprocably driven by a suitable control device 40 to rotate the valves around their axes for a purpose to be subsequently described.

Inwardly of their engagement with the valve seats 22, 23 the heads 34 of the intake and exhaust valves 20, 21 each include inner faces 42, each of which forms a portion of the cylinder closed end, at least when its respective valve is closed. The inner faces 42 are preferably flat and generally coplanar with the cylinder head wall 15 when the valves are closed. If desired, however, the end wall 15 of the cylinder could be formed in a non-flat configuration, such as concave or conical, in which case the preferred configurations of the valve inner faces might be other than flat also.

On its inner face, each of the valves is provided with a vane like arcuate dam 43 which extends for a suitable angular distance of possibly 90°–120° and preferably not less than about 75° or more than about 200°. The dams 43 extend outward from the inner faces and into cooperation with arcuate recesses 44 formed in the piston squish land opposite the locations of the valve heads. The annular recesses 44 intersect the outer edges of the combustion chamber recess 30 and extend outwardly therefrom to provide clearance within the piston squish land for entry of the valve dams when the piston approaches its top dead center position.

When, in normal engine operation, the piston moves upwardly on its compression stroke to approach the top dead center position shown in FIG. 1, the close approach of the squish land 31 to the wall 15 of the cylinder head and inner faces 42 of the valves causes the cylinder air or gas charge to be squeezed out toward the central combustion chamber recess 30 in a squish-like action generally referred to as squish. Conventionally, this squish action is utilized to generate turbulence within the combustion chamber recess which promotes mixing of the air with fuel injected by the fuel injector near the top dead center position and, thereby, aids the promotion of complete combustion of the fuel in the air charge.

According to the present invention, the direction and rate of squish flow may be controlled to some extent by properly positioning the valve mounted dams 43 through rotation of the valves 20, 21 on their axes by the rack and pinion gear means 38, 39 actuated by the control device 40.

Figure 2:
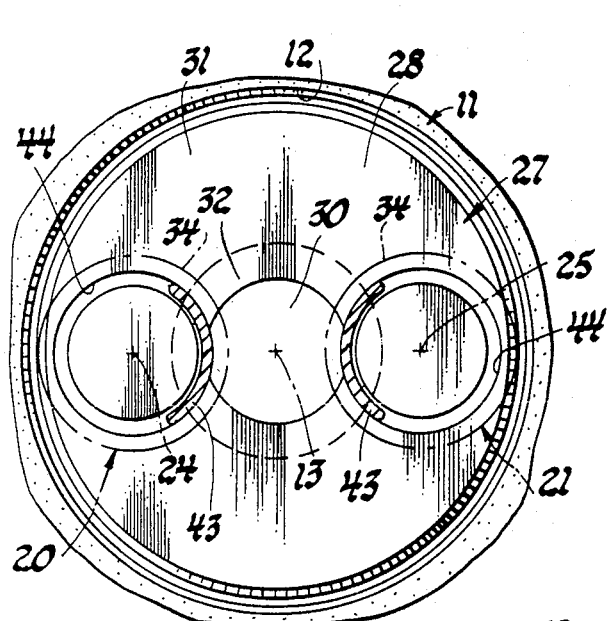
FIG. 2 is a cross-sectional view looking toward the piston from the plane indicated by the line 2—2 of FIG. 1 with the squish control means in a closed high squish position.

When the dams 43 are positioned in their inner positions, as shown in FIGS. 1 and 2, the volume of squish flow from adjacent the valve inner faces is blocked from directly moving toward the combustion chamber recess. Instead, this flow is required to move around the dams, joining with the squish flow from under the remainder of the squish land to enter the combustion chamber recess with this combined flow at a higher than normal flow rate. Thus, the inward positioning of the valve dams tends to increase the squish caused turbulence in the combustion chamber recess as may be desirable under certain engine operating conditions.

Figure 3:
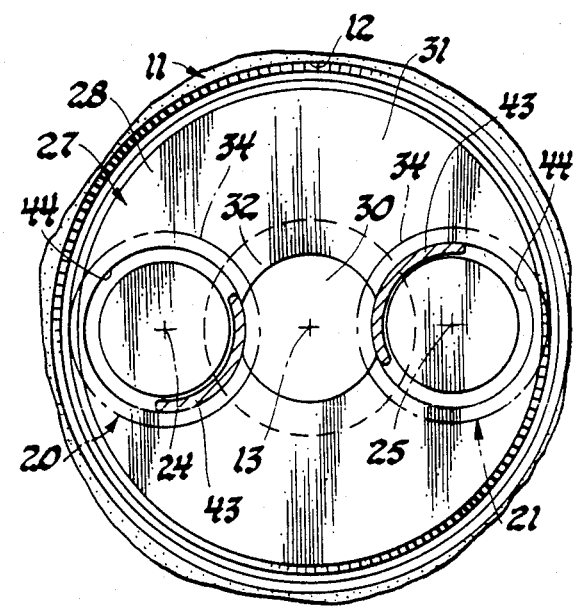
FIG. 3 is a view similar to FIG. 2 but with the squish control means in an intermediate swirl developing position.

When the valve dams are positioned in the intermediate positions shown in FIG. 3, the gas charge adjacent the valve inner faces is directed in a generally clockwise direction to join the squish flow of the adjacent portions of the squish land. This introduces a swirl component to the squish and provides a directional flow to the turbulence within the combustion chamber recess which may be desirable under certain engine operating conditions or circumstances.

Figure 4:
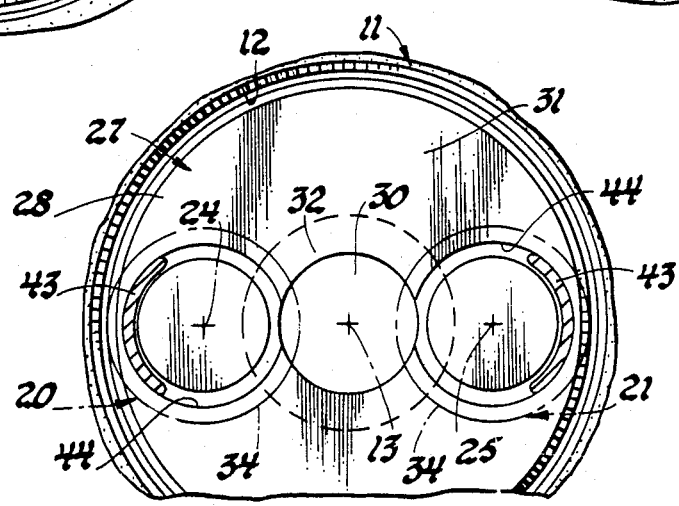
FIG. 4 is a view similar to FIGS. 2 and 3 but with the squish control means in an open low squish position.

When the valve dams are in their outer positions as shown in FIG. 4, the air charge adjacent the valve inner faces is, for the most part, allowed to flow directly toward the combustion chamber recess along side the flow from adjacent the remainder of the squish land. This allows generally radial and equal flow into the combustion chamber recess and results in a more moderate rate of inward squish flow and resultant turbulence within the combustion chamber.

The control of squish flow indicated by the foregoing example is merely representative of the various ways in which squish control means in accordance with the invention may be utilized in an internal combustion engine to provide variations in the manner and rate of squish flow for the purpose of desirably controlling mixing and combustion in an engine combustion chamber. Thus, it should be recognized that various alternative embodiments may also be selected to accomplish the indicated purposes.

For example, if valve mounted dams are utilized, the dams may be located on only one of several valves or on any number of valves within a cylinder. Likewise, rotation of the valves may be controlled separately so as to allow positioning of the dams in any of several selected combinations of positions if desired.

Instead of utilizing valve faces for mounting the dams, it would also be possible to provide movable cylinder end wall surfaces which are separate from the valves and on which rotatably movable dams could be located. Such rotatable devices could be positioned around the periphery of the cylinder end wall or, if desired, located centrally thereof around the fuel injector. In the latter case, a dam might be provided which is selectively movable around the edge of the combustion chamber recess to selectively block inward flow in any one of several desired locations.

Such alternative embodiments of the invention are merely exemplary of the many possible variations which may be apparent to those skilled in the art from the foregoing description of the present invention. Thus, while the invention has been described by reference to certain embodiments chosen for purposes of illustration, it should be understood that numerous changes could be made without departing from the spirit and scope of the inventive concepts disclosed. Accordingly, it is intended that the invention not be limited to the disclosed embodiments, but that it be given the full scope permitted by the language of the following claims.

The embodiments of the invention in which an exclusive property or privilege is claimed are defined as follows:

1. A combination in an internal combustion engine of first means defining a closed end cylinder,
   second means rotatable upon an axis and having an inner face generally normal to the axis and forming a part of the cylinder closed end and a raised arcuate dam extending from the face and centered on the axis,
   a piston reciprocably disposed in the cylinder and having an end wall facing the cylinder closed end, said end wall including a raised portion forming a squish land that extends into closely opposed relation to the cylinder closed end and the inner face when the piston approaches a top dead center position in the cylinder,
   said piston having an arcuate recess in the squish land and formed to receive the dam when the piston is near the top dead center position so as to direct squish flow around the dam, and
   means for altering the angular position of the second means on its axis to change the position of the dam so as to alter the direction of the squish flow generated from between said inner face and the squish land.

2. A combination in an internal combustion engine of means defining a closed end cylinder having at least one port opening through the closed end with an annular valve seat defining the edge of the port opening,
   a poppet valve having a head seatable upon the valve seat and a stem supporting the head, the valve being rotatable and reciprocable upon an axis centered on the opening and normal to the plane of the valve seat, the valve head having an inner face forming a part of the cylinder closed end when the valve is closed and a raised arcuate dam extending from the face and centered on the valve axis, a piston reciprocably disposed in the cylinder and having an end wall facing the cylinder closed end, said end wall including a raised portion forming a squish land that extends into closely opposed relation to the cylinder closed end and the valve inner face when the piston approaches a top dead center position in the cylinder, said piston having an arcuate recess in the squish land and formed to receive the valve dam when the piston is near the top dead center position so as to direct squish flow around the dam, and means for altering the angular position of the valve on its axis to change the position of the dam so as to alter the direction of the squish flow generated from between the valve and the squish land.

3. A combination in an internal combustion engine of means defining a closed end cylinder having at least one port opening through the closed end with an annular valve seat defining the edge of the port opening, a poppet valve having a disc-like head with a circular edge seatable upon the valve seat and a stem supporting the head, the valve being rotatable and reciprocable upon an axis centered on the opening and normal to the plane of the valve seat, the valve head having an inner face forming a part of the cylinder closed end when the valve is closed and a raised arcuate dam extending from the face and centered on the valve axis, a piston reciprocably disposed in the cylinder and having an end wall facing the cylinder closed end, said end wall including a raised portion and a recessed portion, the raised portion forming a squish land that extends into closely opposed relation to the cylinder closed end and the valve inner face when the piston approaches a top dead center position in the cylinder and the recessed portion defining a combustion bowl adjacent to the squish land and into which squish flow is forced as the piston nears top dead center, said piston having an arcuate recess in the squish land and formed to receive the valve dam when the piston is near the top dead center position so as to direct squish flow around the dam, and means for selectively altering the angular position of the valve on its axis to change the position of the dam so as to alter the direction of the squish flow generated from between the valve and the squish land.

4. A combination as in claim 3 wherein the squish land arcuate recess intersects the edge of the combustion bowl such that the valve dam may be positioned to overlap the bowl edge so as to restrict squish flow from adjacent the valve face directly into the combustion bowl or, alternatively, the dam may be positioned away from the bowl edge to allow direct squish flow thereto.

5. A combination as in claim 4 wherein the engine is provided with at least one additional port through the cylinder closed end and a rotatable valve and dam with associated piston squish land portion and arcuate recess and means for actuating the valve are all associated with the additional port and operative to additionally direct squish flow in the manner described relative to the first named port.

6. A combination as in claim 4 wherein the arcuate recess is formed of sufficient length to allow oscillating motion of the valve through at least one-half revolution.

7. A combination as in claim 6 wherein the valve dam has an arcuate length of not less than 75° nor more than 200°.

* * * * *